United States Patent
Roh et al.

(10) Patent No.: US 10,262,237 B2
(45) Date of Patent: Apr. 16, 2019

(54) TECHNOLOGIES FOR IMPROVED OBJECT DETECTION ACCURACY WITH MULTI-SCALE REPRESENTATION AND TRAINING

(71) Applicant: Intel Corporation, Santa Clara, CA (US)

(72) Inventors: Byungseok Roh, Seoul (KR); Kye-Hyeon Kim, Seongnam (KR); Sanghoon Hong, Seoul (KR); Minje Park, Seoul (KR); Yeongjae Cheon, Seoul (KR)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 15/372,953

(22) Filed: Dec. 8, 2016

(65) Prior Publication Data

US 2018/0165551 A1    Jun. 14, 2018

(51) Int. Cl.
*G06K 9/00* (2006.01)
*G06K 9/62* (2006.01)
*G06N 3/04* (2006.01)

(52) U.S. Cl.
CPC ......... *G06K 9/6267* (2013.01); *G06K 9/6232* (2013.01); *G06N 3/0454* (2013.01)

(58) Field of Classification Search
CPC ...... G06K 9/6267; G06K 9/6232; G06N 3/08; G06T 7/0002; G06T 2207/20081; G06T 2200/28
See application file for complete search history.

(56) References Cited

U.S. PATENT DOCUMENTS

| | | | | |
|---|---|---|---|---|
| 6,671,400 | B1* | 12/2003 | Ekpar | G06T 3/4038 |
| | | | | 382/157 |
| 9,373,057 | B1* | 6/2016 | Erhan | G06K 9/6202 |
| 9,400,925 | B2* | 7/2016 | Bourdev | G06K 9/00362 |
| 9,665,802 | B2* | 5/2017 | Wang | G06K 9/66 |
| 9,785,919 | B2* | 10/2017 | Diwinsky | G06Q 10/20 |
| 2017/0206431 | A1* | 7/2017 | Sun | G06K 9/4671 |
| 2017/0262996 | A1* | 9/2017 | Jain | G06T 7/0087 |
| 2017/0286774 | A1* | 10/2017 | Gaidon | G06K 9/00718 |

* cited by examiner

*Primary Examiner* — John B Strege
(74) *Attorney, Agent, or Firm* — Barnes & Thornburg LLP

(57) ABSTRACT

Technologies for multi-scale object detection include a computing device including a multi-layer convolution network and a multi-scale region proposal network (RPN). The multi-layer convolution network generates a convolution map based on an input image. The multi-scale RPN includes multiple RPN layers, each with a different receptive field size. Each RPN layer generates region proposals based on the convolution map. The computing device may include a multi-scale object classifier that includes multiple region of interest (ROI) pooling layers and multiple associated fully connected (FC) layers. Each ROI pooling layer has a different output size, and each FC layer may be trained for an object scale based on the output size of the associated ROI pooling layer. Each ROI pooling layer may generate pooled ROIs based on the region proposals and each FC layer may generate object classification vectors based on the pooled ROIs. Other embodiments are described and claimed.

25 Claims, 5 Drawing Sheets

TECHNOLOGIES FOR IMPROVED OBJECT DETECTION ACCURACY WITH MULTI-SCALE REPRESENTATION AND TRAINING

BACKGROUND

Typical computing devices may use deep learning algorithms, also known as artificial neural networks, to perform object detection. General object detection is a challenging task for computers, since multi-class recognition and accurate localization should be performed simultaneously. Classical approaches separate these two tasks, meaning that a large number of candidate object locations (often called "proposals" or "region proposals") must be processed before classifying the object category on each proposal. Those tasks have been combined into a single deep learning framework. For example, the "Faster R-CNN" approach described by Shaoquing Ren et al., *Faster R-CNN: Towards Real-Time Object Detection with Region Proposal Networks*, Advances in Neural Info. Processing Sys. (2015), introduces the region proposal network (RPN). In the Faster R-CNN approach, the region proposal method is embedded into a single network, and the cost for generating proposals is reduced by sharing front-end convolutional layers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
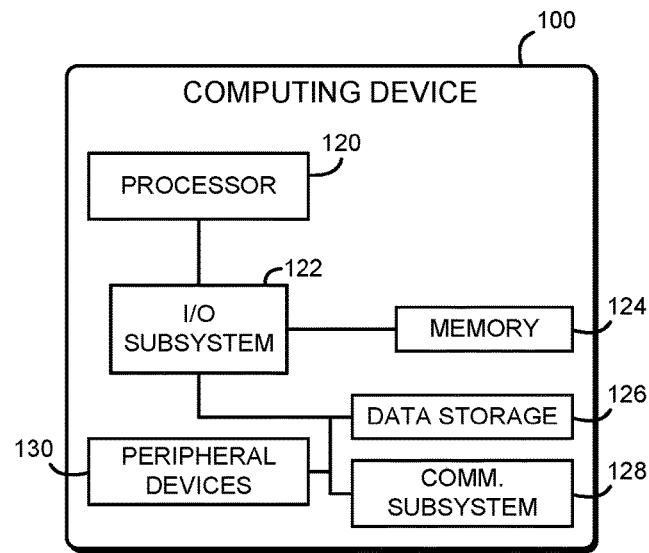
FIG. 1 is a simplified block diagram of at least one embodiment of a computing device for object detection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for object detection includes a processor 120, an I/O subsystem 122, a memory 124, a data storage device 126, and a communications subsystem 128. In use, as described below, the computing device 100 inputs image data into a multi-layer convolution network, which outputs convolution data (e.g., one or more convolution maps) to a multi-scale region proposal network (RPN). The multi-scale RPN generates region proposals with multiple RPN layers, each with a different receptive field size. The computing device 100 may input the convolution data and the region proposals into a multi-scale object classifier, which includes classifiers trained for multiple proposed region sizes. The computing device 100 may analyze data generated by different levels of abstraction in the multi-layer convolution network. By generating region proposals and classifying objects at multiple scales, the computing device 100 may boost object detection accuracy for the same computational cost required for previous approaches. Additionally, by using multi-scale classifiers, the computing device 100 may prevent duplication of pooled features for small objects as compared to scale-dependent pooling.

Table 1, below, illustrates experimental results that may be achieved by at least one embodiment of the computing device 100. Table 1 illustrates PASCAL VOC 2007 20-category object detection for the computing device 100 as compared to the AlexNet system described by Alex Krizhevsky et al., *ImageNet Classification with Deep Convolutional Neural Networks*, Advances in Neural Info. Processing Sys. (2012). As shown, the computing device 100 may improve object detection accuracy from 62% to 73.9% with the same computational cost. Additionally, the 73.9% detection accuracy provided by the computing device 100 may be better than the results (73%) described by Karen Simonyan & Andrew Zisserman, *Very Deep Convolutional Networks for Large-Scale Image Recognition*, Int'l Conf. Learning Representations (2015), which is at least 10 times more complex.

TABLE 1

Results on PASCAL VOC 2007 test set.

|  | mAP | bicycle | bird | bus | car | cat | dog | horse | m. bike | person |
|---|---|---|---|---|---|---|---|---|---|---|
| AlexNet | 62 | 72 | 57.5 | 73.7 | 73.5 | 75.7 | 72.5 | 79.5 | 72.1 | 65.4 |
| Device 100 | 73.9 | 79.1 | 75.1 | 84.3 | 79.2 | 86.4 | 85 | 83.7 | 80.3 | 74.4 |

|  | train | aero | boat | bottle | chair | cow | table | plant | sheep | sofa | tv |
|---|---|---|---|---|---|---|---|---|---|---|---|
| AlexNet | 70.7 | 67 | 51.8 | 33.1 | 38.6 | 62.9 | 59.1 | 30.5 | 63.3 | 58.4 | 63.3 |
| Device 100 | 86.3 | 77.3 | 62.9 | 53.4 | 53.4 | 82.1 | 70.8 | 44.8 | 73.3 | 74.7 | 71.7 |

Referring back to FIG. 1, the computing device 100 may be embodied as any type of device capable of object detection and otherwise performing the functions described herein. For example, the computing device 100 may be embodied as, without limitation, a computer, a workstation, a server, a laptop computer, a notebook computer, a tablet computer, a smartphone, a wearable computing device, a multiprocessor system, and/or a consumer electronic device. As shown in FIG. 1, the illustrative computing device 100 includes the processor 120, the I/O subsystem 122, the memory 124, and the data storage device 126.l Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The data storage device 126 may store image data, training data, or other data used for object detection.

The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The computing device 100 may further include one or more peripheral devices 130. The peripheral devices 130 may include any number of additional input/output devices, interface devices, and/or other peripheral devices. For example, in some embodiments, the peripheral devices 130 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
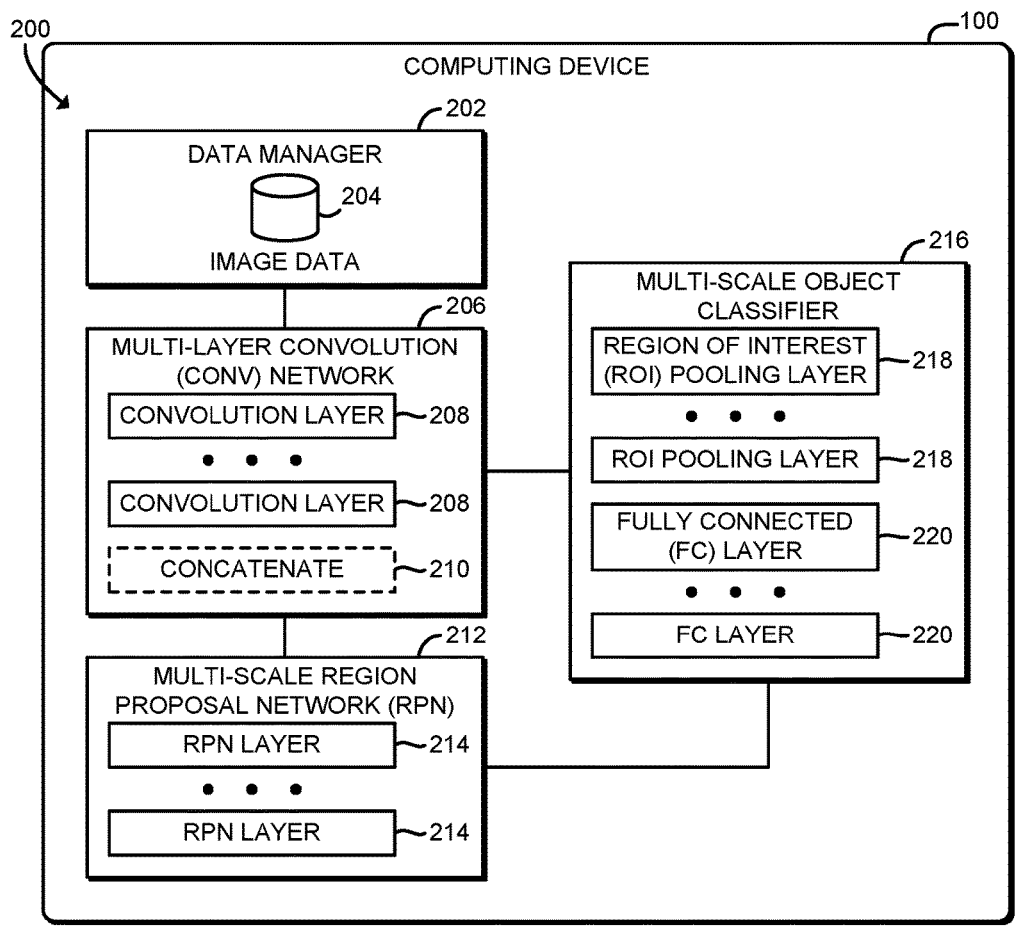
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a data manager 202, a multi-layer convolution network 206, a multi-scale region proposal network (RPN) 212, and a multi-scale object classifier 216. The various components of the environment 200 may be embodied as hardware, firmware, software, or a combination thereof. As such, in some embodiments, one or more of the components of the environment 200 may be embodied as circuitry or collection of electrical devices (e.g., data manager circuitry 202, multi-layer convolution network circuitry 206, multi-scale RPN circuitry 212, and/or multi-scale object classifier circuitry 216). It should be appreciated that, in such embodiments, one or more of the data manager circuitry 202, the multi-layer convolution network circuitry 206, the multi-scale RPN circuitry 212, and/or the multi-scale object classifier circuitry 216 may form a portion of the processor 120, the I/O subsystem 122, and/or other components of the computing device 100 (e.g., a GPU or processor graphics in some embodiments). Additionally, in some embodiments, one or more of the illustrative components may form a portion of another component and/or one or more of the illustrative components may be independent of one another.

The data manager 202 is configured to input an input image into the multi-layer convolution network 206. The input image may be embodied as or otherwise included in image data 204, which may be stored by or otherwise accessed by the computing device 100.

The multi-layer convolution network 206 includes multiple convolution layers 208 and in some embodiments may include one or more concatenation layers 210. The multi-layer convolution network 206 is configured to generate a convolution map in response to input of an image. In some embodiments, the multi-layer convolution network 206 may be further configured to concatenate multiple convolution maps generated by different convolution layers 208 to generate a concatenated convolution map. In some embodiments, the multi-layer convolution network 206 may be further configured to input the concatenated convolution map into a convolution layer with a kernel size of one square.

The multi-scale RPN 212 includes multiple RPN layers 214. Each RPN layer 214 has a different receptive field size. The multi-scale RPN 212 is configured to generate multiple region proposals in response to input of a convolution map. Each region proposal is output by a corresponding RPN layer 214. Each region proposal illustratively includes a classification vector and a regression vector.

The data manager 202 is further configured to input the convolution map into the multi-scale RPN 212. Inputting the convolution map into the multi-scale RPN 212 may include inputting a convolution map from a different convolution layer 208 of the multi-layer convolution network 206 into each of the RPN layers 214. The data manager 202 may be further configured to input the convolution map and the plurality of region proposals into the multi-scale object classifier 216.

The multi-scale object classifier 216 includes multiple region of interest (ROI) pooling layers 218 and multiple fully connected (FC) layers 220. Each ROI pooling layer 218 has a different output size and each ROI pooling layer 218 is associated with a corresponding FC layer 220. Each FC layer 220 may be trained for an object scale based on the output size of the corresponding ROI pooling layer 218. The multi-scale object classifier 216 is configured to generate object classification vectors in response to input of the convolution map and the plurality of region proposals. Each object classification vector corresponds to a region proposal. The multi-scale object classifier 216 may be further configured to select each ROI pooling layer 218 based on a proposed object size of a corresponding region proposal and the output size of the ROI pooling layer 218. The multi-scale object classifier 216 may further include a trainable selection network to select the ROI pooling layer 218.

Figure 3:
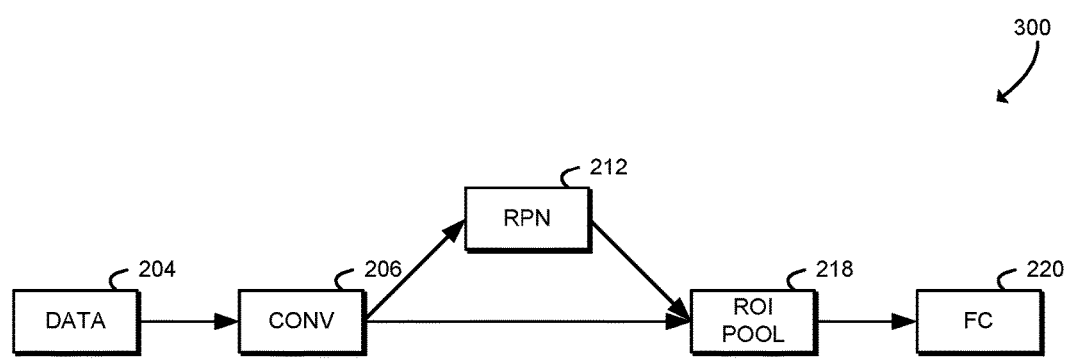
FIG. 3 is a simplified block diagram of an object detection network that may be established by the computing device of FIGS. 1-2.

Referring now to FIG. 3, diagram 300 illustrates an overview of a deep learning framework that may be established by the computing device 100. The diagram 300 illustrates one potential arrangement of the components of the environment 200 that may be executed by the computing device 100. As shown, the image data 204 is input to the multi-layer convolution network 206. The image data 204 may be embodied as RGB image data that may include multiple objects. The multi-layer convolution network 206 passes the data through multiple convolution layers 208, which each output a convolution map. The convolution map is input to the multi-scale RPN 212. The RPN 212 includes multiple RPN layers 214, each with a different receptive field size to process the convolution map. In some embodiments, each RPN layer 214 may process a convolution map at a different layer of abstraction, e.g., from a different convolution layer 208. The RPN 212 outputs region proposals from each RPN layer 214. Each region proposal includes a classification vector to predict whether objects have been detected in the image data and a regression vector to predict the bounding box coordinates of those objects. The convolution map and the region proposals are input into the ROI pooling layers 218, which generate a pooled region of interest (ROI) for each region proposal. The pooled ROIs are input to the FC layers 220, which generate a classification vector for each pooled region of interest. The classification vector may be used to localize and identify the objects detected in the image data 204.

Figure 4:
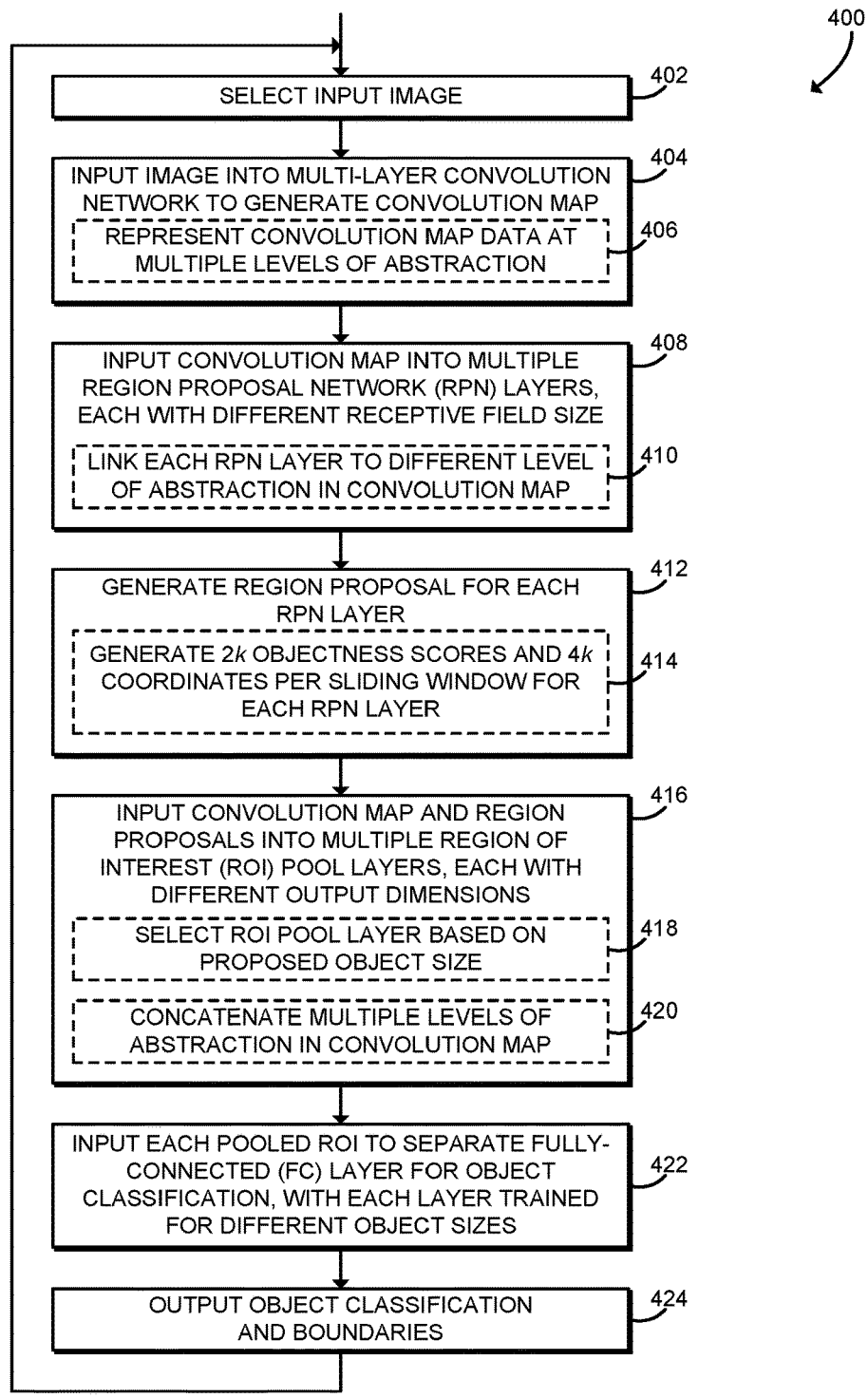
FIG. 4 is a simplified flow diagram of at least one embodiment of a method for object detection that may be executed by the computing device of FIGS. 1 and 2.

Referring now to FIG. 4, in use, the computing device 100 may execute a method 400 for object recognition. It should be appreciated that, in some embodiments, the operations of the method 400 may be performed by one or more components of the environment 200 of the computing device 100 as shown in FIG. 2. The method 400 begins in block 402, in which the computing device 100 selects an input image from the image data 204. The computing device 100 may select the image, for example, in response to user input or any other request for image processing. Although this disclosure describes analyzing a single image, it should be understood that in some embodiments, the computing device 100 may select a batch of multiple images for processing using the techniques disclosed herein.

In block 404, the computing device 100 inputs the image data into the multi-layer convolution network 206 to generate a convolution map. In some embodiments, in block 406, the computing device 100 may represent the convolution map data at multiple levels of abstraction of the multi-layer convolution network 206. For example, the computing device 100 may store or otherwise provide access to the convolution map data generated by each convolution layer 208. In some embodiments, the computing device 100 may provide access to each convolution layer 208, or to a sampling or otherwise less than all of the convolution layers 208.

In block 408, the computing device 100 inputs the convolution map into multiple region proposal network (RPN) layers 214. Each of the RPN layers 214 has a different receptive field size. By separating each of the RPN layers 214, each pipe of the multi-scale RPN 212 may be trained independently—at different receptive field sizes—to produce more accurate and relevant region proposals according to visual characteristics such as size and textureness of target objects. In the illustrative embodiment, the computing device 100 inputs the convolution map into three region proposal network layers 214a, 214b, 214c, which have a receptive field size of one pixel square, three pixels square, and five pixels square, respectively. Of course, in other embodiments the computing device 100 may use a different number of RPN layers 214 and/or different receptive field sizes. In some embodiments, in block 410 the computing device 100 may link each RPN layer 214 to a different level of abstraction in the convolution map. For example, the computing device 100 may input the convolution map from a different convolution layer 208 into each of the RPN layers 214. In particular, in some embodiments small-sized region proposals may be generated from an early convolution layer 208 rather than from the final feature. In the illustrative embodiment, the output from the seventh, 10th, and 13th convolution layers 208 are input to the RPN layers 214 to generate region proposals independently. Of course, in other embodiments the computing device 100 may process convolution map data generated by a different number and/or levels of the convolution layers 208.

In block 412, the computing device 100 executes the multi-scale RPN 212 to generate a region proposal from each RPN layer 214. In some embodiments, in block 414 the computing device 100 may generate 2k objectness scores and 4k proposed object coordinates for each sliding window position of each RPN layer 214. Each of the objectness scores estimates the probability of object or not object for each region proposal, and each of the proposed object coordinates encodes the coordinates of the bounding box of the proposed object (i.e., coordinates of the four corners). The value k represents the number of anchors used to generate region proposals. Each anchor represents a different size and/or aspect ratio of a bounding box used to generate region proposals for each sliding window position. In the illustrative embodiment, the computing device 100 evaluates nine anchors and thus k equals nine.

In block 416, the computing device 100 inputs the convolution map and the region proposals into multiple ROI pooling layers 218. The ROI pooling layers 218 pool the contents of the convolution map within the region proposals to generate pooled regions of interest (ROIs). The ROI pooling layers 218 may use any appropriate pooling algorithm, such as max-pooling. Each of the ROI pooling layers 218 has different output dimensions. In some embodiments, in block 418 the computing device 100 may select the ROI pooling layer 218 based on the proposed object size of a region proposal. For example, the multi-scale object classifier 216 may include a decision module to pick a classifier (e.g., a ROI pooling layer 218 and associated FC layer 220) which fits for a given region proposal to achieve the best accuracy. The decision module may also be trained.

In some embodiments, in block 420 the computing device 100 may concatenate multiple levels of abstraction in the convolution map that is input to the ROI pooling layers 218. Including multiple levels of abstraction in the convolution map may improve accuracy (i.e., semantics) and/or localization. For example, low-level features from an earlier part of the convolution network 206 may include structures or boundaries of objects, while high-level features from a later part of the convolution network 206 may be capable of generating robust and abstracted object categories. As described above, the illustrative multi-layer convolution network 206 includes 13 convolution layers 208, and in the illustrative embodiment, representations from the seventh, 10th, and 13th convolution layers 208 are retrieved and concatenated. Since each layer must have the same feature dimension to concatenate, sizes (e.g., width and height) of features may be adjusted before constructing a hyper-feature layer. Thus, as described further below in connection with FIG. 8, the multi-layer convolution network 206 may include a pooling layer inserted after the seventh convolution layer 208 and a deconvolution (or upsampling) layer inserted after the 13th convolution layer 208, so that all of the features have the same dimensions. Those three output features may be concatenated and input into 1×1 convolutional layer for dimension reduction and another rectified linear activation. Of course, in other embodiments the computing device 100 may process convolution map data generated by a different number and/or levels of the convolution layers 208.

In block 422, the computing device 100 inputs the pooled ROIs from each ROI pooling layer 218 into a separate FC layer 220. Each FC layer 220 is trained for a different object scale with different input dimensions. For example, the multi-scale object classifier 216 may include a classifier (e.g., a ROI pooling layer 218 and a corresponding FC layer 220) for objects bigger than 128 pixels and another classifier (e.g., a ROI pooling layer 218 and a corresponding FC layer 220) for objects smaller than 128 pixels. The latter sub-network may be trained and tested with the smaller input dimensions, and thus may make small objects detectable with better accuracy, without losing accuracy for bigger objects. In block 424, the computing device 100 may output object classification and boundaries from the FC layers 220. After outputting the output classification and boundaries, the method 400 loops back to block 402, in which the computing device 100 may process additional images.

Figure 5:
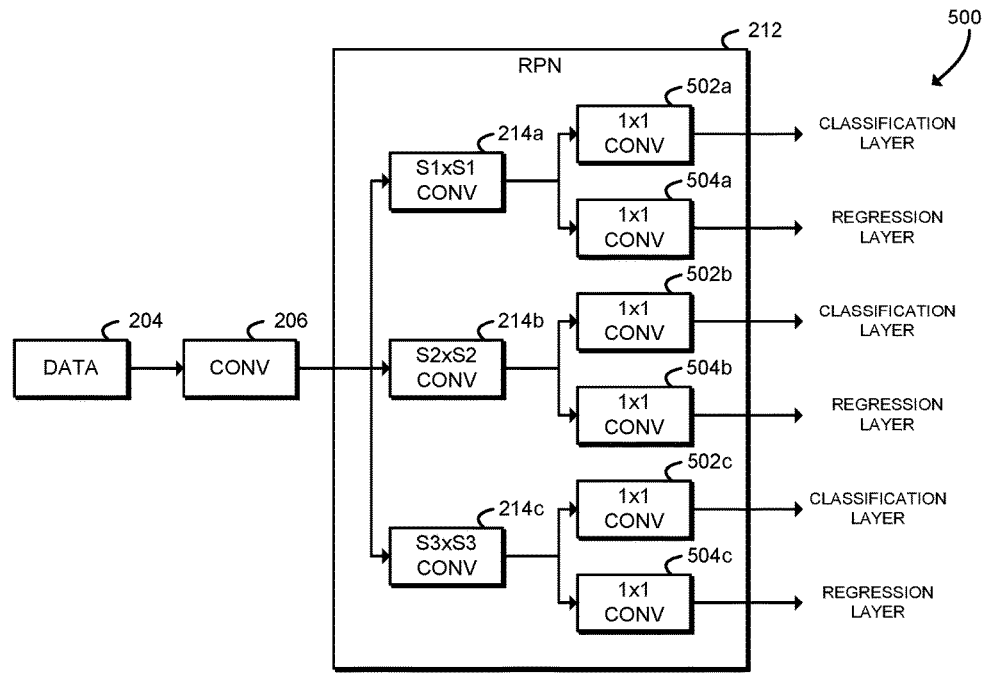
FIG. 5 is a simplified block diagram of a multi-scale region proposal network that may be established by the computing device of FIGS. 1 and 2.

Referring now to FIG. 5, diagram 500 illustrates one embodiment of a multi-scale RPN 212 that may be established by the computing device 100. As shown, image data 204 is input to the multi-layer convolution network 206. The convolution map output by the convolution network 206 is input to the multi-scale RPN 212. The multi-scale RPN 212 includes three RPN layers 214a, 214b, 214c that each processes the convolution map. Each RPN layer 214 has a different receptive field size (i.e., kernel size). For example, the RPN layers 214a, 214b, 214c may have receptive field sizes of one pixel square, three pixels square, and five pixels square, respectively. The output of each RPN layer 214 is input to a 1×1 convolution layer 502 to generate a classification layer and a 1×1 convolution layer 504 to generate a regression layer. As described above, the output of the multi-scale RPN 212 (e.g., the classification layers and the regression layers) may be input to the multi-scale object classifier 216 as region proposals.

Figure 6:
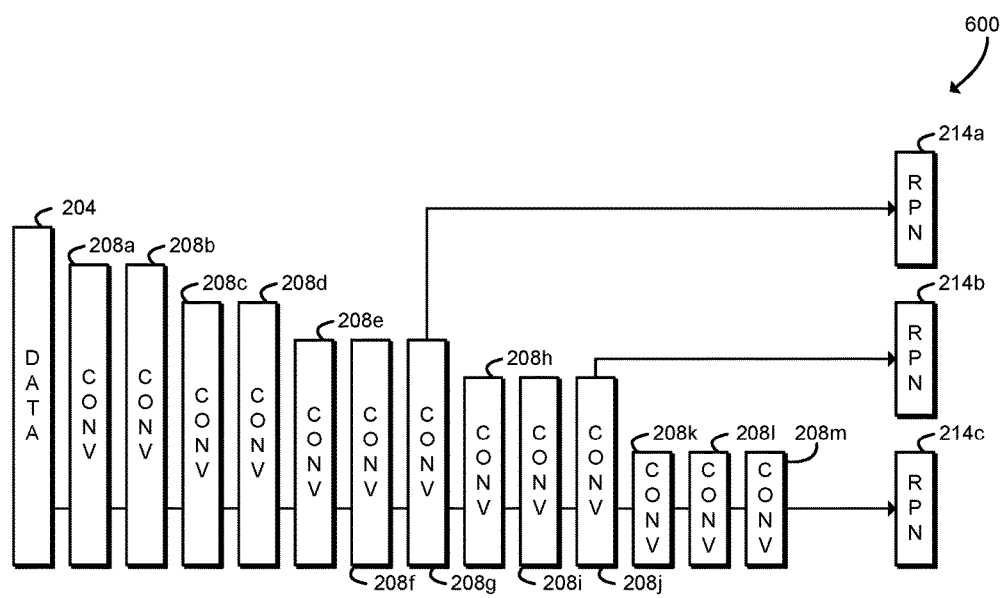
FIG. 6 is a simplified block diagram of data flow between a multi-layer convolution network and a multi-scale region proposal network that may be established by the computing device of FIGS. 1 and 2.

Referring now to FIG. 6, diagram 600 illustrates one embodiment of data flow between the multi-layer convolution network 206 and the multi-scale RPN 212 that may be established by the computing device 100. As shown, the illustrative multi-layer convolution network 206 includes 13 convolution layers 208a through 208m, and the multi-scale RPN 212 includes three RPN layers 214a through 214c. The image data 204 is input to the convolution layer 208a, which outputs a convolution map that is input to the next convolution layer 208b, which outputs a convolution map that is input to the next convolution layer 208c, and so on. In the illustrative embodiment, the convolution map output by the convolution layer 208g is also input to the RPN layer 214a, the convolution map output by the convolution layer 208j is also input to the RPN layer 214b, and the convolution map output by the convolution layer 208m (the last layer) is output to the RPN layer 214c. Therefore, each RPN layer 214 may process a convolution map from a different level of the multi-layer convolution network 206 and thus may process image data at a different level of abstraction.

Figure 7:
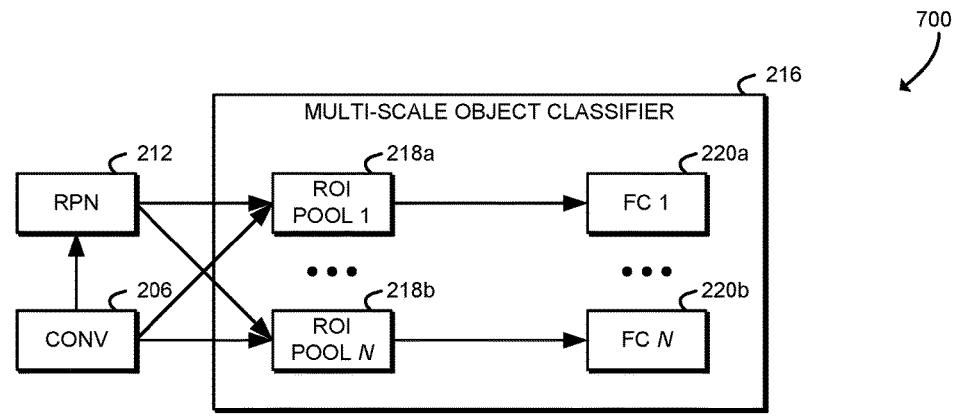
FIG. 7 is a simplified block diagram of a multi-scale object classifier that may be established by the computing device of FIGS. 1 and 2.

Referring now to FIG. 7, diagram 700 illustrates one embodiment of a multi-scale object classifier 216 that may be established by the computing device 100. As shown, a convolution map output from the multi-layer convolution network 206 is input into both the multi-scale RPN 212 and the multi-scale object classifier 216. The region proposals (i.e., classification and regression layers) output by the multi-scale RPN 212 are also input into the multi-scale object classifier 216. The illustrative multi-scale object classifier 216 includes two ROI pooling layers 218a, 218b and two corresponding FC layers 220a, 220b. Each of the ROI pooling layers 218a, 218b receives the convolution map and region proposals as input and generates pooled ROIs. The pooled ROIs output by the ROI pooling layers 218*a*, 218*b* are input into the corresponding FC layers 220*a*, 220*b*. Each of the FC layers 220*a*, 220*b* outputs object classification vectors.

Figure 8:
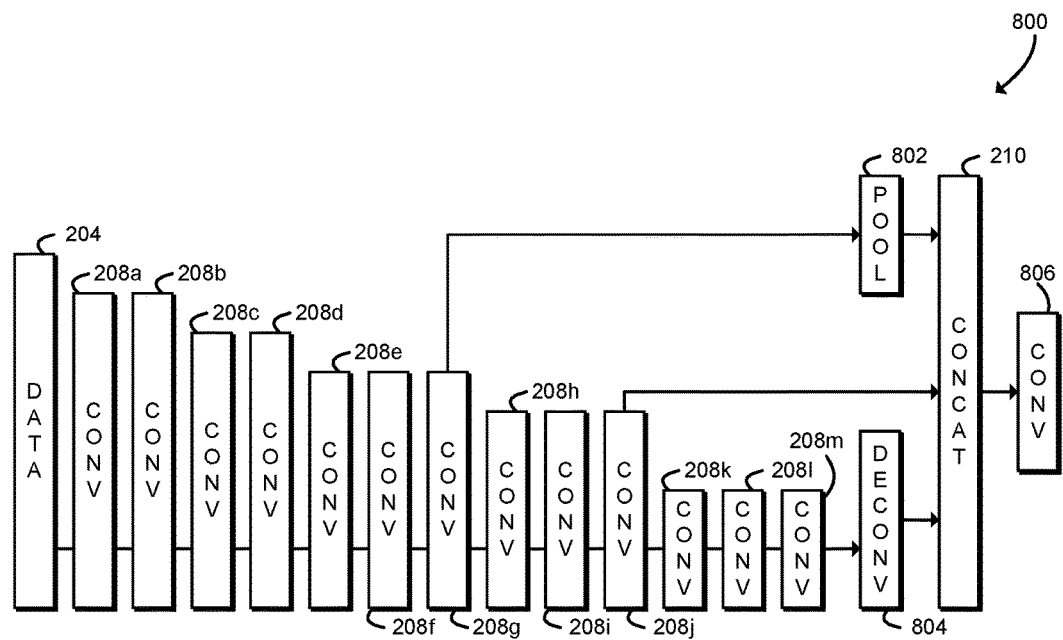
FIG. 8 is a simplified block diagram of a multi-layer convolution network that may be established by the computing device of FIGS. 1 and 2.

Referring now to FIG. 8, diagram 800 illustrates another embodiment of data flow of the multi-layer convolution network 206 that may be established by the computing device 100. As shown, the multi-layer convolution network 206 includes 13 convolution layers 208*a* through 208*m*. The multi-layer convolution network 206 also includes a concatenation layer 210 that concatenates convolution map data generated at different levels of abstraction. In particular, the illustrative concatenation layer 210 concatenates convolution map data output by the convolution layers 208*g*, 208*j*, 208*m*. The illustrative concatenation layer 210 may only concatenate data of the same size; therefore, the convolution map data output from the convolution layer 208*g* is processed by a pooling layer 802 and the convolution data output from the convolution layer 208*m* is processed by a deconvolution layer 804 to generate data with the same size as the convolution map data generated by the convolution layer 208*j*. The concatenated data generated by the concatenation layer 210 is input to a 1×1 convolution layer 806 for dimension reduction and another rectified linear activation. The convolution map data output by the convolution layer 806 thus may include convolution data from multiple levels of abstraction and may be input into the multi-scale RPN 212 and/or the multi-scale object classifier 216.

It should be appreciated that, in some embodiments, the method 400 may be embodied as various instructions stored on a computer-readable media, which may be executed by the processor 120, a graphical processing unit (GPU), and/or other components of the computing device 100 to cause the computing device 100 to perform the method 400. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for object detection, the computing device comprising a data manager, a multi-layer convolution network, and a multi-scale region proposal network, wherein: the multi-scale region proposal network includes a plurality of region proposal network layers, wherein each region proposal network layer has a different receptive field size; the data manager is to input an input image into the multi-layer convolution network; the multi-layer convolution network is to generate a convolution map in response to an input of the input image; the data manager is further to input the convolution map into the multi-scale region proposal network; and the multi-scale region proposal network is to generate a plurality of region proposals in response to an input of the convolution map, wherein each region proposal is output by a corresponding region proposal network layer, and wherein each region proposal includes a classification vector and a regression vector.

Example 2 includes the subject matter of Example 1, and wherein the multi-scale region proposal network comprises three region proposal network layers.

Example 3 includes the subject matter of any of Examples 1 and 2, and wherein the first region proposal network layer has a receptive field size of one pixel square, the second region proposal network layer has a receptive field size of three pixels square, and the third region proposal network layer has a receptive field size of five pixels square.

Example 4 includes the subject matter of any of Examples 1-3, and wherein to input the convolution map into the multi-scale region proposal network comprises to input a convolution map from a different convolution layer of the multi-layer convolution network into each of the plurality of region proposal network layers.

Example 5 includes the subject matter of any of Examples 1-4, and wherein: the multi-layer convolution network comprises thirteen convolution layers; the multi-scale region proposal network comprises three region proposal network layers; and to input the convolution map into the plurality of region proposal network layers comprises to input a convolution map from the seventh convolution layer into the first region proposal network layer, input a convolution map from the tenth convolution layer into the second region proposal network layer, and input a convolution map from the thirteenth convolution layer into the third region proposal network layer.

Example 6 includes the subject matter of any of Examples 1-5, and wherein each classification vector comprises 2k objectness scores for each sliding window location of the corresponding region proposal network layer, wherein k comprises a predetermined number of anchors.

Example 7 includes the subject matter of any of Examples 1-6, and wherein each regression vector comprises 4k object boundary coordinates for each sliding window location of the corresponding region proposal network layer, wherein k comprises a predetermined number of anchors.

Example 8 includes the subject matter of any of Examples 1-7, and further comprising a multi-scale object classifier, wherein: the multi-scale object classifier includes a plurality of region of interest pooling layers and a plurality of fully connected layers, wherein each region of interest pooling layer has a different output size and wherein each region of interest pooling layer is associated with a fully connected layer; the data manager is further to input the convolution map and the plurality of region proposals into the multi-scale object classifier; and the multi-scale object classifier is to generate a plurality of object classification vectors in response to an input of the convolution map and the plurality of region proposals, wherein each object classification vector corresponds to a region proposal.

Example 9 includes the subject matter of any of Examples 1-8, and wherein each fully connected layer is trained for an object scale based on the output size of the associated region of interest pooling layer.

Example 10 includes the subject matter of any of Examples 1-9, and wherein the multi-scale object classifier comprises a first fully connected layer trained for image dimensions smaller than 128 pixels and a second fully connected layer trained for image dimensions greater than or equal to 128 pixels.

Example 11 includes the subject matter of any of Examples 1-10, and wherein: a first region of interest pooling layer of the multi-scale object classifier is to generate a first pooled region of interest that corresponds to a first region proposal of the plurality of region proposals; the multi-scale object classifier is to input the first pooled region of interest into the fully connected layer associated with the first region of interest pooling layer; and the fully connected layer is to generate a first object classification vector that corresponds to the first region proposal in response to an input of the first pooled region of interest.

Example 12 includes the subject matter of any of Examples 1-11, and wherein: the multi-scale object classifier is further to select the first region of interest pooling layer based on a proposed object size of the first region proposal and the output size of the first region of interest pooling layer; and to generate the first pooled region of interest comprises to generate the first pooled region of interest in response to selection of the first region of interest pooling layer.

Example 13 includes the subject matter of any of Examples 1-12, and wherein: the multi-scale object classifier further comprises a trainable selection network; and to select the first region of interest pooling layer comprises to select the first region of interest pooling layer with the trainable selection network.

Example 14 includes the subject matter of any of Examples 1-13, and wherein: the multi-layer convolution network comprises a plurality of convolution layers; and the multi-layer convolution network is further to concatenate a plurality of convolution maps to generate a concatenated convolution map, wherein each of the convolution maps is generated by a different convolution layer of the plurality of convolution layers.

Example 15 includes the subject matter of any of Examples 1-14, and wherein: the multi-layer convolution network comprises thirteen convolution layers; and to concatenate the plurality of convolution maps comprises to concatenate a convolution map generated by the seventh convolution layer, a convolution map generated by the tenth convolution layer, and a convolution map generated by the thirteenth convolution layer.

Example 16 includes the subject matter of any of Examples 1-15, and wherein to concatenate the plurality of convolution maps further comprises to resize the plurality of convolution maps.

Example 17 includes the subject matter of any of Examples 1-16, and wherein the multi-layer convolution network is further to input the concatenated convolution map to a convolution layer with a kernel size of une square.

Example 18 includes a method for object detection, the method comprising: inputting, by a computing device, an input image into a multi-layer convolution network; executing, by the computing device, the multi-layer convolution network in response to inputting the input image to generate a convolution map; inputting, by the computing device, the convolution map into a multi-scale region proposal network that includes a plurality of region proposal network layers, wherein each region proposal network layer has a different receptive field size; and executing, by the computing device, the multi-scale region proposal network in response to inputting the convolution map to generate a plurality of region proposals, wherein each region proposal is output by a corresponding region proposal network layer, and wherein each region proposal includes a classification vector and a regression vector.

Example 19 includes the subject matter of Example 18, and wherein the multi-scale region proposal network comprises three region proposal network layers.

Example 20 includes the subject matter of any of Examples 18 and 19, and wherein the first region proposal network layer has a receptive field size of one pixel square, the second region proposal network layer has a receptive field size of three pixels square, and the third region proposal network layer has a receptive field size of five pixels square.

Example 21 includes the subject matter of any of Examples 18-20, and wherein inputting the convolution map into the multi-scale region proposal network comprises inputting a convolution map from a different convolution layer of the multi-layer convolution network into each of the plurality of region proposal network layers.

Example 22 includes the subject matter of any of Examples 18-21, and wherein: executing the multi-layer convolution network comprises executing a multi-layer convolution network that includes thirteen convolution layers; executing the multi-scale region proposal network comprises executing a multi-scale region proposal network that includes three region proposal network layers; and inputting the convolution map into the plurality of region proposal network layers comprises inputting a convolution map from the seventh convolution layer into the first region proposal network layer, inputting a convolution map from the tenth convolution layer into the second region proposal network layer, and inputting a convolution map from the thirteenth convolution layer into the third region proposal network layer.

Example 23 includes the subject matter of any of Examples 18-22, and wherein each classification vector comprises 2k objectness scores for each sliding window location of the corresponding region proposal network layer, wherein k comprises a predetermined number of anchors.

Example 24 includes the subject matter of any of Examples 18-23, and wherein each regression vector comprises 4k object boundary coordinates for each sliding window location of the corresponding region proposal network layer, wherein k comprises a predetermined number of anchors.

Example 25 includes the subject matter of any of Examples 18-24, and further comprising: inputting, by the computing device, the convolution map and the plurality of region proposals into a multi-scale object classifier that includes a plurality of region of interest pooling layers, wherein each region of interest pooling layer has a different output size and wherein each region of interest pooling layer is associated with a fully connected layer; and executing, by the computing device, the multi-scale object classifier in response to inputting the convolution map and the plurality of region proposals to generate a plurality of object classification vectors, wherein each object classification vector corresponds to a region proposal.

Example 26 includes the subject matter of any of Examples 18-25, and wherein each fully connected layer is trained for an object scale based on the output size of the associated region of interest pooling layer.

Example 27 includes the subject matter of any of Examples 18-26, and wherein the multi-scale object classifier comprises a first fully connected layer trained for image dimensions smaller than 128 pixels and a second fully connected layer trained for image dimensions greater than or equal to 128 pixels.

Example 28 includes the subject matter of any of Examples 18-27, and wherein executing the multi-scale object classifier comprises: executing a first region of interest pooling layer to generate a first pooled region of interest corresponding to a first region proposal of the plurality of region proposals; inputting the first pooled region of interest into the fully connected layer associated with the first region of interest pooling layer; and executing the fully connected layer in response to inputting the first pooled region of interest to generate a first object classification vector corresponding to the first region proposal.

Example 29 includes the subject matter of any of Examples 18-28, and wherein executing the multi-scale object classifier further comprises selecting the first region of interest pooling layer based on a proposed object size of the first region proposal and the output size of the first region of interest pooling layer; and executing the first region of interest pooling layer comprises executing the region of interest pooling layer in response to selecting the first region of interest pooling layer.

Example 30 includes the subject matter of any of Examples 18-29, and wherein selecting the first region of interest pooling layer comprises selecting the first region of interest pooling layer with a trainable selection network of the multi-scale object classifier.

Example 31 includes the subject matter of any of Examples 18-30, and wherein executing the multi-layer convolution network comprises: executing a multi-layer convolution network that includes a plurality of convolution layers; and concatenating a plurality of convolution maps to generate a concatenated convolution map, wherein each of the convolution maps is generated by a different convolution layer of the plurality of convolution layers.

Example 32 includes the subject matter of any of Examples 18-31, and wherein: executing the multi-layer convolution network comprises executing a multi-layer convolution network that includes thirteen convolution layers; and concatenating the plurality of convolution maps comprises concatenating a convolution map generated by the seventh convolution layer, a convolution map generated by the tenth convolution layer, and a convolution map generated by the thirteenth convolution layer.

Example 33 includes the subject matter of any of Examples 18-32, and wherein concatenating the plurality of convolution maps comprises resizing the plurality of convolution maps.

Example 34 includes the subject matter of any of Examples 18-33, and wherein executing the multi-layer convolution network further comprises inputting the concatenated convolution map to a convolution layer with a kernel size of one square.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for object detection, the computing device comprising: means for inputting an input image into a multi-layer convolution network; means for executing the multi-layer convolution network in response to inputting the input image to generate a convolution map; means for inputting the convolution map into a multi-scale region proposal network that includes a plurality of region proposal network layers, wherein each region proposal network layer has a different receptive field size; and means for executing the multi-scale region proposal network in response to inputting the convolution map to generate a plurality of region proposals, wherein each region proposal is output by a corresponding region proposal network layer, and wherein each region proposal includes a classification vector and a regression vector.

Example 39 includes the subject matter of Example 38, and wherein the multi-scale region proposal network comprises three region proposal network layers.

Example 40 includes the subject matter of any of Examples 38 and 39, and wherein the first region proposal network layer has a receptive field size of one pixel square, the second region proposal network layer has a receptive field size of three pixels square, and the third region proposal network layer has a receptive field size of five pixels square.

Example 41 includes the subject matter of any of Examples 38-40, and wherein the means for inputting the convolution map into the multi-scale region proposal network comprises means for inputting a convolution map from a different convolution layer of the multi-layer convolution network into each of the plurality of region proposal network layers.

Example 42 includes the subject matter of any of Examples 38-41, and wherein: the means for executing the multi-layer convolution network comprises means for executing a multi-layer convolution network that includes thirteen convolution layers; the means for executing the multi-scale region proposal network comprises means for executing a multi-scale region proposal network that includes three region proposal network layers; and the means for inputting the convolution map into the plurality of region proposal network layers comprises means for inputting a convolution map from the seventh convolution layer into the first region proposal network layer, inputting a convolution map from the tenth convolution layer into the second region proposal network layer, and inputting a convolution map from the thirteenth convolution layer into the third region proposal network layer.

Example 43 includes the subject matter of any of Examples 38-42, and wherein each classification vector comprises 2k objectness scores for each sliding window location of the corresponding region proposal network layer, wherein k comprises a predetermined number of anchors.

Example 44 includes the subject matter of any of Examples 38-43, and wherein each regression vector comprises 4k object boundary coordinates for each sliding window location of the corresponding region proposal network layer, wherein k comprises a predetermined number of anchors.

Example 45 includes the subject matter of any of Examples 38-44, and further comprising: means for inputting the convolution map and the plurality of region proposals into a multi-scale object classifier that includes a plurality of region of interest pooling layers, wherein each region of interest pooling layer has a different output size and wherein each region of interest pooling layer is associated with a fully connected layer; and means for executing the multi-scale object classifier in response to inputting the convolution map and the plurality of region proposals to generate a plurality of object classification vectors, wherein each object classification vector corresponds to a region proposal.

Example 46 includes the subject matter of any of Examples 38-45, and wherein each fully connected layer is trained for an object scale based on the output size of the associated region of interest pooling layer.

Example 47 includes the subject matter of any of Examples 38-46, and wherein the multi-scale object classifier comprises a first fully connected layer trained for image dimensions smaller than 128 pixels and a second fully connected layer trained for image dimensions greater than or equal to 128 pixels.

Example 48 includes the subject matter of any of Examples 38-47, and wherein the means for executing the multi-scale object classifier comprises: means for executing a first region of interest pooling layer to generate a first pooled region of interest corresponding to a first region proposal of the plurality of region proposals; means for inputting the first pooled region of interest into the fully connected layer associated with the first region of interest pooling layer; and means for executing the fully connected layer in response to inputting the first pooled region of interest to generate a first object classification vector corresponding to the first region proposal.

Example 49 includes the subject matter of any of Examples 38-48, and wherein the means for executing the multi-scale object classifier further comprises means for selecting the first region of interest pooling layer based on a proposed object size of the first region proposal and the output size of the first region of interest pooling layer; and the means for executing the first region of interest pooling layer comprises means for executing the region of interest pooling layer in response to selecting the first region of interest pooling layer.

Example 50 includes the subject matter of any of Examples 38-49, and wherein the means for selecting the first region of interest pooling layer comprises means for selecting the first region of interest pooling layer with a trainable selection network of the multi-scale object classifier.

Example 51 includes the subject matter of any of Examples 38-50, and wherein the means for executing the multi-layer convolution network comprises: means for executing a multi-layer convolution network that includes a plurality of convolution layers; and means for concatenating a plurality of convolution maps to generate a concatenated convolution map, wherein each of the convolution maps is generated by a different convolution layer of the plurality of convolution layers.

Example 52 includes the subject matter of any of Examples 38-51, and wherein: the means for executing the multi-layer convolution network comprises means for executing a multi-layer convolution network that includes thirteen convolution layers; and the means for concatenating the plurality of convolution maps comprises means for concatenating a convolution map generated by the seventh convolution layer, a convolution map generated by the tenth convolution layer, and a convolution map generated by the thirteenth convolution layer.

Example 53 includes the subject matter of any of Examples 38-52, and wherein the means for concatenating the plurality of convolution maps comprises means for resizing the plurality of convolution maps.

Example 54 includes the subject matter of any of Examples 38-53, and wherein the means for executing the multi-layer convolution network further comprises means for inputting the concatenated convolution map to a convolution layer with a kernel size of one square.

The invention claimed is:

1. A computing device for object detection, the computing device comprising a data manager, a multi-layer convolution network, and a multi-scale region proposal network, wherein:

the multi-scale region proposal network includes a plurality of region proposal network layers, wherein each region proposal network layer has a different receptive field size;
the data manager is to input an input image into the multi-layer convolution network;
the multi-layer convolution network is to generate a convolution map in response to an input of the input image;
the data manager is further to input the convolution map into the multi-scale region proposal network; and
the multi-scale region proposal network is to generate a plurality of region proposals in response to an input of the convolution map, wherein each region proposal is output by a corresponding region proposal network layer, and wherein each region proposal includes a classification vector and a regression vector.

2. The computing device of claim 1, wherein the multi-scale region proposal network comprises three region proposal network layers.

3. The computing device of claim 2, wherein the first region proposal network layer has a receptive field size of one pixel square, the second region proposal network layer has a receptive field size of three pixels square, and the third region proposal network layer has a receptive field size of five pixels square.

4. The computing device of claim 1, wherein to input the convolution map into the multi-scale region proposal network comprises to input a convolution map from a different convolution layer of the multi-layer convolution network into each of the plurality of region proposal network layers.

5. The computing device of claim 4, wherein:
the multi-layer convolution network comprises thirteen convolution layers;
the multi-scale region proposal network comprises three region proposal network layers; and
to input the convolution map into the plurality of region proposal network layers comprises to input a convolution map from the seventh convolution layer into the first region proposal network layer, input a convolution map from the tenth convolution layer into the second region proposal network layer, and input a convolution map from the thirteenth convolution layer into the third region proposal network layer.

6. The computing device of claim 1, further comprising a multi-scale object classifier, wherein:
the multi-scale object classifier includes a plurality of region of interest pooling layers and a plurality of fully connected layers, wherein each region of interest pooling layer has a different output size and wherein each region of interest pooling layer is associated with a fully connected layer;
the data manager is further to input the convolution map and the plurality of region proposals into the multi-scale object classifier; and
the multi-scale object classifier is to generate a plurality of object classification vectors in response to an input of the convolution map and the plurality of region proposals, wherein each object classification vector corresponds to a region proposal.

7. The computing device of claim 6, wherein each fully connected layer is trained for an object scale based on the output size of the associated region of interest pooling layer.

8. The computing device of claim 7, wherein the multi-scale object classifier comprises a first fully connected layer trained for image dimensions smaller than 128 pixels and a second fully connected layer trained for image dimensions greater than or equal to 128 pixels.

9. The computing device of claim 6, wherein:
a first region of interest pooling layer of the multi-scale object classifier is to generate a first pooled region of interest that corresponds to a first region proposal of the plurality of region proposals;
the multi-scale object classifier is to input the first pooled region of interest into the fully connected layer associated with the first region of interest pooling layer; and
the fully connected layer is to generate a first object classification vector that corresponds to the first region proposal in response to an input of the first pooled region of interest.

10. The computing device of claim 9, wherein:
the multi-scale object classifier is further to select the first region of interest pooling layer based on a proposed object size of the first region proposal and the output size of the first region of interest pooling layer; and
to generate the first pooled region of interest comprises to generate the first pooled region of interest in response to selection of the first region of interest pooling layer.

11. The computing device of claim 10, wherein:
the multi-scale object classifier further comprises a trainable selection network; and
to select the first region of interest pooling layer comprises to select the first region of interest pooling layer with the trainable selection network.

12. The computing device of claim 1, wherein:
the multi-layer convolution network comprises a plurality of convolution layers; and
the multi-layer convolution network is further to concatenate a plurality of convolution maps to generate a concatenated convolution map, wherein each of the convolution maps is generated by a different convolution layer of the plurality of convolution layers.

13. The computing device of claim 12, wherein the multi-layer convolution network is further to input the concatenated convolution map to a convolution layer with a kernel size of one square.

14. A method for object detection, the method comprising:
inputting, by a computing device, an input image into a multi-layer convolution network;
executing, by the computing device, the multi-layer convolution network in response to inputting the input image to generate a convolution map;
inputting, by the computing device, the convolution map into a multi-scale region proposal network that includes a plurality of region proposal network layers, wherein each region proposal network layer has a different receptive field size; and
executing, by the computing device, the multi-scale region proposal network in response to inputting the convolution map to generate a plurality of region proposals, wherein each region proposal is output by a corresponding region proposal network layer, and wherein each region proposal includes a classification vector and a regression vector.

15. The method of claim 14, wherein inputting the convolution map into the multi-scale region proposal network comprises inputting a convolution map from a different convolution layer of the multi-layer convolution network into each of the plurality of region proposal network layers.

16. The method of claim 14, further comprising:
inputting, by the computing device, the convolution map and the plurality of region proposals into a multi-scale object classifier that includes a plurality of region of interest pooling layers, wherein each region of interest pooling layer has a different output size and wherein each region of interest pooling layer is associated with a fully connected layer; and
executing, by the computing device, the multi-scale object classifier in response to inputting the convolution map and the plurality of region proposals to generate a plurality of object classification vectors, wherein each object classification vector corresponds to a region proposal.

17. The method of claim 16, wherein each fully connected layer is trained for an object scale based on the output size of the associated region of interest pooling layer.

18. The method of claim 16, wherein executing the multi-scale object classifier comprises:
executing a first region of interest pooling layer to generate a first pooled region of interest corresponding to a first region proposal of the plurality of region proposals;
inputting the first pooled region of interest into the fully connected layer associated with the first region of interest pooling layer; and
executing the fully connected layer in response to inputting the first pooled region of interest to generate a first object classification vector corresponding to the first region proposal.

19. The method of claim 14, wherein executing the multi-layer convolution network comprises:
executing a multi-layer convolution network that includes a plurality of convolution layers; and
concatenating a plurality of convolution maps to generate a concatenated convolution map, wherein each of the convolution maps is generated by a different convolution layer of the plurality of convolution layers.

20. One or more computer-readable storage media comprising a plurality of instructions that in response to being executed cause a computing device to:
input an input image into a multi-layer convolution network;
execute the multi-layer convolution network in response to inputting the input image to generate a convolution map;
input the convolution map into a multi-scale region proposal network that includes a plurality of region proposal network layers, wherein each region proposal network layer has a different receptive field size; and
execute the multi-scale region proposal network in response to inputting the convolution map to generate a plurality of region proposals, wherein each region proposal is output by a corresponding region proposal network layer, and wherein each region proposal includes a classification vector and a regression vector.

21. The one or more computer-readable storage media of claim 20, wherein to input the convolution map into the multi-scale region proposal network comprises to input a convolution map from a different convolution layer of the multi-layer convolution network into each of the plurality of region proposal network layers.

22. The one or more computer-readable storage media of claim 20, further comprising a plurality of instructions that in response to being executed cause the computing device to:
input the convolution map and the plurality of region proposals into a multi-scale object classifier that includes a plurality of region of interest pooling layers, wherein each region of interest pooling layer has a different output size and wherein each region of interest pooling layer is associated with a fully connected layer; and execute the multi-scale object classifier in response to inputting the convolution map and the plurality of region proposals to generate a plurality of object classification vectors, wherein each object classification vector corresponds to a region proposal.

23. The one or more computer-readable storage media of claim 22, wherein each fully connected layer is trained for an object scale based on the output size of the associated region of interest pooling layer.

24. The one or more computer-readable storage media of claim 22, wherein to execute the multi-scale object classifier comprises to:

execute a first region of interest pooling layer to generate a first pooled region of interest corresponding to a first region proposal of the plurality of region proposals;

input the first pooled region of interest into the fully connected layer associated with the first region of interest pooling layer; and execute the fully connected layer in response to inputting the first pooled region of interest to generate a first object classification vector corresponding to the first region proposal.

25. The one or more computer-readable storage media of claim 20, wherein to execute the multi-layer convolution network comprises to:

execute a multi-layer convolution network that includes a plurality of convolution layers; and concatenate a plurality of convolution maps to generate a concatenated convolution map, wherein each of the convolution maps is generated by a different convolution layer of the plurality of convolution layers.

* * * * *